United States Patent
McPheeters et al.

[11] Patent Number: 5,882,809
[45] Date of Patent: Mar. 16, 1999

[54] SOLID OXIDE FUEL CELL WITH MULTI-UNIT CONSTRUCTION AND PRISMATIC DESIGN

[75] Inventors: Charles C. McPheeters, Naperville; Dennis W. Dees; Kevin M. Myles, both of Downers Grove, all of Ill.

[73] Assignee: U.S. The United States of America as represented by the United States Department of Energy, Washington, D.C.

[21] Appl. No.: 775,530

[22] Filed: Jan. 2, 1997

[51] Int. Cl.⁶ .............................. H01M 8/12; H01M 8/24
[52] U.S. Cl. .................. 429/30; 429/32; 429/34; 264/618
[58] Field of Search .................. 429/12, 30, 34, 429/35, 38, 39, 32; 364/618, 629

[56] References Cited

U.S. PATENT DOCUMENTS

| | | | |
|---|---|---|---|
| 4,476,196 | 10/1984 | Poeppel et al. | 429/32 |
| 4,476,197 | 10/1984 | Herceg et al. | 429/32 |
| 4,476,198 | 10/1984 | Ackerman et al. | 429/32 |
| 4,499,663 | 2/1985 | Zwick et al. | 429/32 |
| 4,510,212 | 4/1985 | Fraioli | 429/30 |
| 4,666,798 | 5/1987 | Herceg et al. | 429/12 |
| 4,761,349 | 8/1988 | McPheeters et al. | 429/30 |
| 4,816,036 | 3/1989 | Kotchick | 429/30 |
| 4,857,420 | 8/1989 | Maricle et al. | 429/30 |
| 4,883,497 | 11/1989 | Claar et al. | 29/623.5 |
| 5,242,873 | 9/1993 | Singh et al. | 501/103 |
| 5,273,837 | 12/1993 | Aitken et al. | 429/30 |
| 5,312,700 | 5/1994 | Ishida | 429/30 |
| 5,330,859 | 7/1994 | McPheeters | 429/30 |
| 5,368,951 | 11/1994 | Shiratori et al. | 429/30 |
| 5,460,897 | 10/1995 | Gibson et al. | 429/39 |
| 5,486,428 | 1/1996 | Gardner et al. | 429/19 |
| 5,688,610 | 11/1997 | Spach et al. | 429/30 |

*Primary Examiner*—Stephen Kalafut
*Attorney, Agent, or Firm*—Lisa M. Soltis; Mark P. Dvorscak; William R. Moser

[57] ABSTRACT

A single cell unit of a solid oxide fuel cell that is individually fabricated and sintered prior to being connected to adjacent cells to form a solid oxide fuel cell. The single cell unit is comprised of a shaped anode sheet positioned between a flat anode sheet and an anode-electrolyte-cathode (A/E/C) sheet, and a shaped cathode sheet positioned between the A/E/C sheet and a cathode-interconnect-anode (C/I/A) sheet. An alternate embodiment comprises a shaped cathode sheet positioned between an A/E/C sheet and a C/I/A sheet. The shaped sheets form channels for conducting reactant gases. Each single cell unit is individually sintered to form a finished sub-assembly. The finished sub-assemblies are connected in electrical series by interposing connective material between the end surfaces of adjacent cells, whereby individual cells may be inspected for defects and interchanged with non-defective single cell units.

29 Claims, 3 Drawing Sheets

5,882,809

SOLID OXIDE FUEL CELL WITH MULTI-UNIT CONSTRUCTION AND PRISMATIC DESIGN

CONTRACTUAL ORIGIN OF THE INVENTION

The United States Government has rights in this invention pursuant to Contract Number W-31-109-ENG-38 between the United States Government and Argonne National Laboratory.

CROSS-REFERENCE TO RELATED APPLICATIONS

Not applicable.

BACKGROUND OF INVENTION

1. Field of the Invention

The present invention relates to a single cell unit design for a solid oxide fuel cell (SOFC), and more particularly, to a SOFC comprised of a plurality of pre-sintered single cell units which are connected in electrical series, whereby a single cell unit may be individually examined for defects and replaced without permanently impairing the performance of the SOFC stack.

SOFCs have been the subject of considerable study. Representative of this technology are U.S. Pat. Nos. 4,476,198 to Ackerman, et al.; 4,510,212 to Fraioli; 4,761,349 to McPheeters, et al.; 4,857,420 to Maricle et al.; and 5,330,859 to McPheeters, et al.; wherein each relate to certain aspects of SOFCs.

2. Background of the Invention

Fuel cells are electrochemical systems which generate electrical current by chemically reacting a fuel gas and an oxidant gas on the surface of electrodes. Solid oxide fuel cells (SOFCs), which are fuel cells having electrolyte material in a solid form, are generally comprised of a stack of individual cells which are connected in electrical series to generate a useful voltage. In a conventional SOFC design, four materials are used to fabricate each single cell unit: anode, cathode, electrolyte, and interconnect material. Within each cell, the solid electrolyte material separates the anode and cathode materials, which comprise the electrodes. The interconnect material electronically connects the anode of one cell with the cathode of an adjacent cell.

Several configurations for SOFCs have been developed, including the tubular, flat plate, and monolithic designs. In a tubular design, each single cell unit includes electrode and electrolyte layers applied to the periphery of a porous support tube. While the inner cathode layer completely surrounds the support tube, the solid electrolyte and outer anode structures are discontinuous to provide a space for the electrical interconnection of the cell to the outer surface of parallel cells. Fuel gas is directed over the exterior of the tubular cells, and oxidant gas is directed through the interior of the tubular cells.

The flat plate design incorporates the use of electrolyte sheets which are coated on opposite sides with layers of anode and cathode material. Ribbed distributors may also be provided on the opposite sides of the coated electrolyte sheet to form flow channels for the reactant gases. A conventional cross flow pattern is constructed when the flow channels on the anode side of the electrolyte are perpendicular to those on the cathode side. Cross flow patterns, as opposed to co-flow patterns where the flow channels for the fuel gas and oxidant gas are parallel, allow for simpler, conventional manifolding systems to be incorporated into the fuel cell structure. The manifolding system delivers the reactant gases to the fuel cell. The coated electrolyte sheets and distributors of the flat plate design are tightly stacked between current conducting bipolar plates. In an alternate flat plate design, uncoated electrolyte sheets are stacked between porous plates of anode, cathode, and interconnecting material, with gas delivery tubes extending through the structure.

The monolithic solid oxide fuel cell (MSOFC) design is characterized by a honeycomb structure. The MSOFC is constructed by tape casting or calendar rolling the sheet components of the cell, which include thin composites of anode-electrolyte-cathode (A/E/C) material and anode-interconnect-cathode (A/I/C) material. The sheet components are corrugated to form co-flow channels, wherein the fluid gas flows through channels formed by the anode layers, and the oxidant gas flows through parallel channels formed by the cathode layers. The monolithic structure, comprising many single cell layers, is assembled in a green or unfired state and co-sintered to fuse the materials into a rigid, dimensionally stable SOFC core.

These conventional designs have been improved upon in the prior art to achieve high power densities. Power density is increased by incorporating smaller single unit cell heights and shorter cell-to-cell electronic conduction paths. SOFC designs have thus incorporated thin components which are fused together to form a continuous, bonded structure. However, the large number of small components, layers, and interconnections, in addition to complex fabrication steps, decreases the reliability of operational fuel cells.

Difficulties associated with constructing prior art designs, especially in monolithic configurations, occur when various layers of materials having differing compositions and thermal expansion characteristics are co-sintered to form the core of the SOFC. Assembling component parts in a green or unfired state and co-sintering the assembly to fuse the components into a continuous, bonded structure restricts which materials may be selected for use and the thicknesses of the selected materials. Furthermore, considerable thermal stresses arise due to thermal gradients across the cell structure. Defects, such as cracking, can occur during firing, which negatively effect the performance of the fuel cell. Where adjacent cells are fused or bonded together, a single cell which is defectively formed cannot be interchanged with a non-defective cell, and the performance of the assembled fuel cell stack is impaired.

One solution to the above cited problem of micro-cracks developing in component layers is presented in U.S. Pat. No. 4,857,420 to Maricle, which discloses a method of making a monolithic SOFC from finished sub-assemblies. The sub-assemblies, which include electrode sub-assemblies and separator plate-flow field sub-assemblies, are individually sintered to operating size and density prior to being assembled into a SOFC. After the sintered sub-assemblies are layered to construct the fuel cell core, the assembled fuel cell is fused together by heating the fuel cell to a sub-sintering temperature and subjecting the fuel cell to a compressive load (creep flattening), forming a monolithic structure.

An alternative solution is presented in U.S. Pat. No. 5,273,837 to Aitken which discloses the use of pre-sintered ceramic sheets for the construction of electrolyte layers and/or gas channeling structures. Use of pre-sintered flat or corrugated ceramic sheets for cell components provides flexibility, strength, and high thermal shock resistance, characteristics which are not readily achievable in co-sintered prior art designs.

The difficulty of fabricating a continuous, bonded structure with four different materials is similarly addressed in U.S. Pat. No. 5,330,859 to McPheeters, et al., which provides for a SOFC having anode, cathode, and interconnect material comprised of substantially one material.

A low cost, easily fabricated, reliable SOFC is needed for applications where high power density is not critical, and the interchangeability of defective single cell units is desired.

Therefore, in view of the above, a basic object of the present invention is to provide a reliable, low cost method of fabricating a SOFC for applications where a high power density is not required, and wherein a defect in a single cell unit would not permanently impair the performance of the SOFC stack.

A further object of this invention is to provide a design for a single cell unit of a SOFC that is easy to fabricate and allows for the application of conventional manifolding systems utilizing a cross flow pattern for reactant gases.

Another object of this invention is to provide a single cell unit of a SOFC that is individually sintered prior to being assembled into a SOFC stack.

Yet another object of this invention is to connect pre-sintered single cell units in electrical series to form a SOFC stack, whereby the SOFC is not bonded into a continuous structure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentation and combinations particularly pointed out in the appended claims.

BRIEF SUMMARY OF THE INVENTION

This invention provides a design for a single cell unit of a solid oxide fuel cell (SOFC), which includes sintering the single cell unit into a finished component before assembly into a SOFC stack. The single cell unit design includes a corrugated anode sheet provided between a flat anode sheet and an anode-electrolyte-cathode (A/E/C) composite sheet, and a corrugated cathode sheet provided between the A/E/C composite sheet and a cathode-interconnect-anode (C/I/A) composite sheet. The corrugated anode sheet and the corrugated cathode sheet define perpendicular flow channels for reactant gases. The single cell unit is individually fabricated and sintered at a high temperature to form a continuous, bonded structure.

In this invention, the sintered single cell units are connected to adjacent sintered single cell units by providing conducting material between the end surfaces of adjacent cells. The resultant cell stack is not bonded into a continuous structure, but is held together mechanically, such as by clamping. Therefore, if a single cell unit is defective, the single cell unit may be interchanged with a non-defective cell without requiring rejection of the entire cell stack.

An alternate design for a single cell is further provided in this invention, wherein a corrugated cathode sheet is disposed between an A/E/C composite sheet and a C/I/A composite sheet, such that oxidant gas flows through the channels of the cathode sheet corrugations, and fuel gas flows through the cell-to-cell conductive material. The conductive material may be porous to allow fuel gas to flow through the material or may define flow channels for conducting the fuel gas.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE INVENTION

The present invention relates to a design for a single cell unit of a solid oxide fuel cell (SOFC) which has approximately prismatic cross flow channels for fuel gas and oxidant gas, and more particularly, to a SOFC comprised of a plurality of pre-sintered single cell units which are connected in electrical series, whereby a defective single cell unit may be interchanged or replaced by a non-defective single cell unit without requiring rejection of the entire SOFC.

Figure 1:
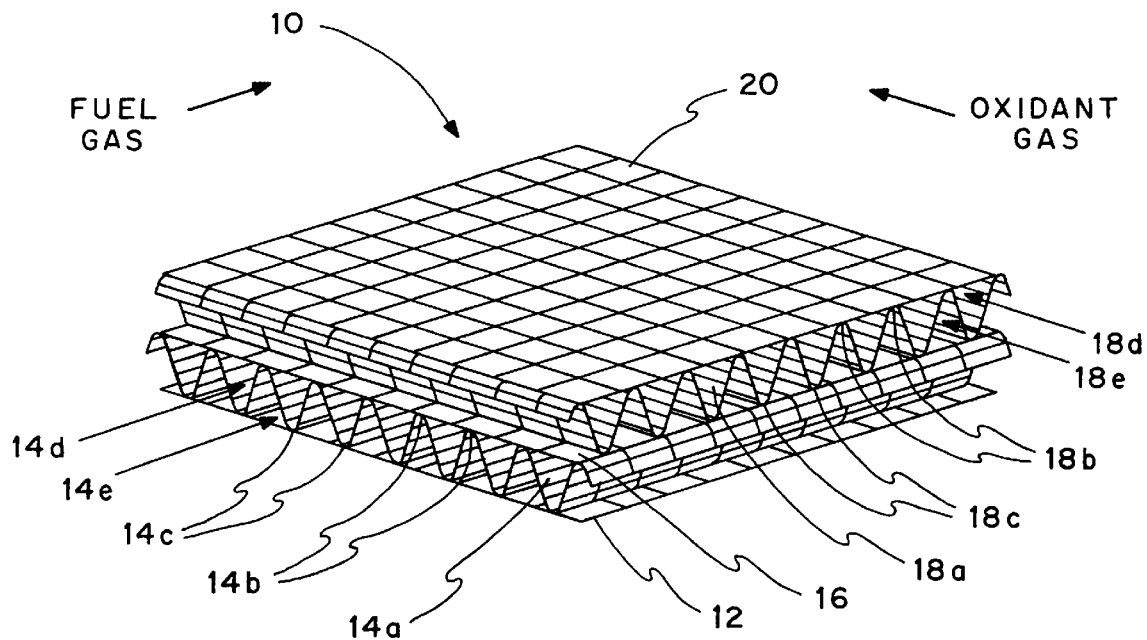
FIG. 1 shows a single cell unit having approximately prismatic cross flow channels.

FIG. 1 illustrates the prismatic design for the single cell unit 10. The cell includes three parallel flat sheets separated by two corrugated sheets. The three flat sheets constitute a flat anode sheet 12 and two composite sheets: anode-electrolyte-cathode (A/E/C) composite sheet 16 and cathode-interconnect-anode (C/I/A) composite sheet 20. The flat anode sheet 12 serves as an end surface for connecting the single cell unit in electrical series to an adjacent cell.

Figure 2:
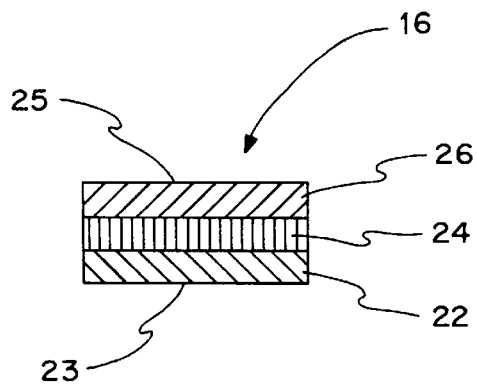
FIG. 2 is a cross sectional view of an anode-electrolyte-cathode composite sheet.

A/E/C composite sheet 16, a cross sectional view of which is shown in FIG. 2, is made of a layer of anode material 22, a layer of cathode material 26, and an intermediate layer of electrolyte material 24 sandwiched therebetween. A/E/C composite sheet 16 is bounded on its anode or bottom surface 23 by corrugated anode sheet 14a, and bounded on its cathode or top surface 25 by corrugated cathode sheet 18a.

Figure 3:
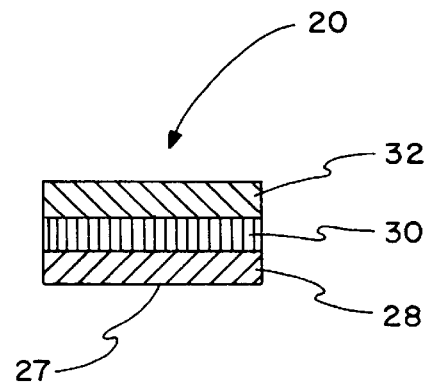
FIG. 3 is a cross sectional view of a cathode-interconnect-anode composite sheet.

C/I/A composite sheet 20, a cross sectional view of which is shown in FIG. 3, is made of a layer of cathode material 28, a layer of anode material 32, and an intermediate layer of interconnect material 30 sandwiched therebetween. C/I/A composite sheet 20 is bounded on its cathode or bottom surface 27 by corrugated cathode sheet 18a. The anode layer 32 of the C/I/A composite sheet 20 serves as an end surface for connecting the single cell unit 10 in electrical series to an adjacent cell.

Corrugated anode sheet 14a is positioned between flat anode sheet 12 and A/E/C composite sheet 16, such that the peaks 14b of the corrugations are bonded to the anode layer 22 of A/E/C composite sheet 16, and the troughs 14c of the corrugations are bonded to flat anode sheet 12. The corrugated anode sheet 14a, in combination with the anode layer 22 of the A/E/C composite sheet 16 and the flat anode sheet 12, form a plurality of flow channels 4d, 4e for fuel gas.

Corrugated cathode sheet 18a is positioned between C/I/A composite sheet 20 and A/E/C composite sheet 16, such that the peaks 18b of the corrugations are bonded to the cathode layer 28 of C/I/A composite sheet 20 and the troughs 18c of the corrugations are bonded to cathode layer 26 of A/E/C composite sheet 16. Corrugated cathode sheet 18a, in combination with the cathode layer 28 of C/I/A composite sheet 20 and the cathode layer 26 of A/E/C composite sheet 16, form a plurality of flow channels 18d, 18e for oxidant gas. The flow channels 18d, 18e for oxidant gas are approximately perpendicular to the flow channels 14d, 14e for fuel gas, creating a cross flow pattern for the reactant gases. Since the flow channels formed by the corrugated sheets are approximately prismatic in shape, this configuration is entitled the prismatic design.

The anode and cathode materials are selected to comply with the operational requirements of a conventional SOFC, including gas porosity and electrical conductivity. For example, the anode material may consist of a cermet comprised of yttria-stabilized zirconia and nickel metal, and the cathode material may consist of strontium-doped lanthanum manganite. The electrolyte is selected for ionic transfer and electronic insulation capabilities, and may consist of yttria-stabilized zirconia. The interconnect material must conform to operational gas imperforate requirements.

Single cell unit 10 is individually fabricated and sintered at a high temperature prior to being assembled into a SOFC. Sintering the single cell unit fuses the component materials together into a finished sub-assembly. Specifically, interfacial lines and planes of contact, such as at 14b, 18c, 18b and 23, 25, and 27, respectively, include interdiffused materials from adjacent layers to bond the single cell unit together into an integral sub-assembly.

Figure 4:
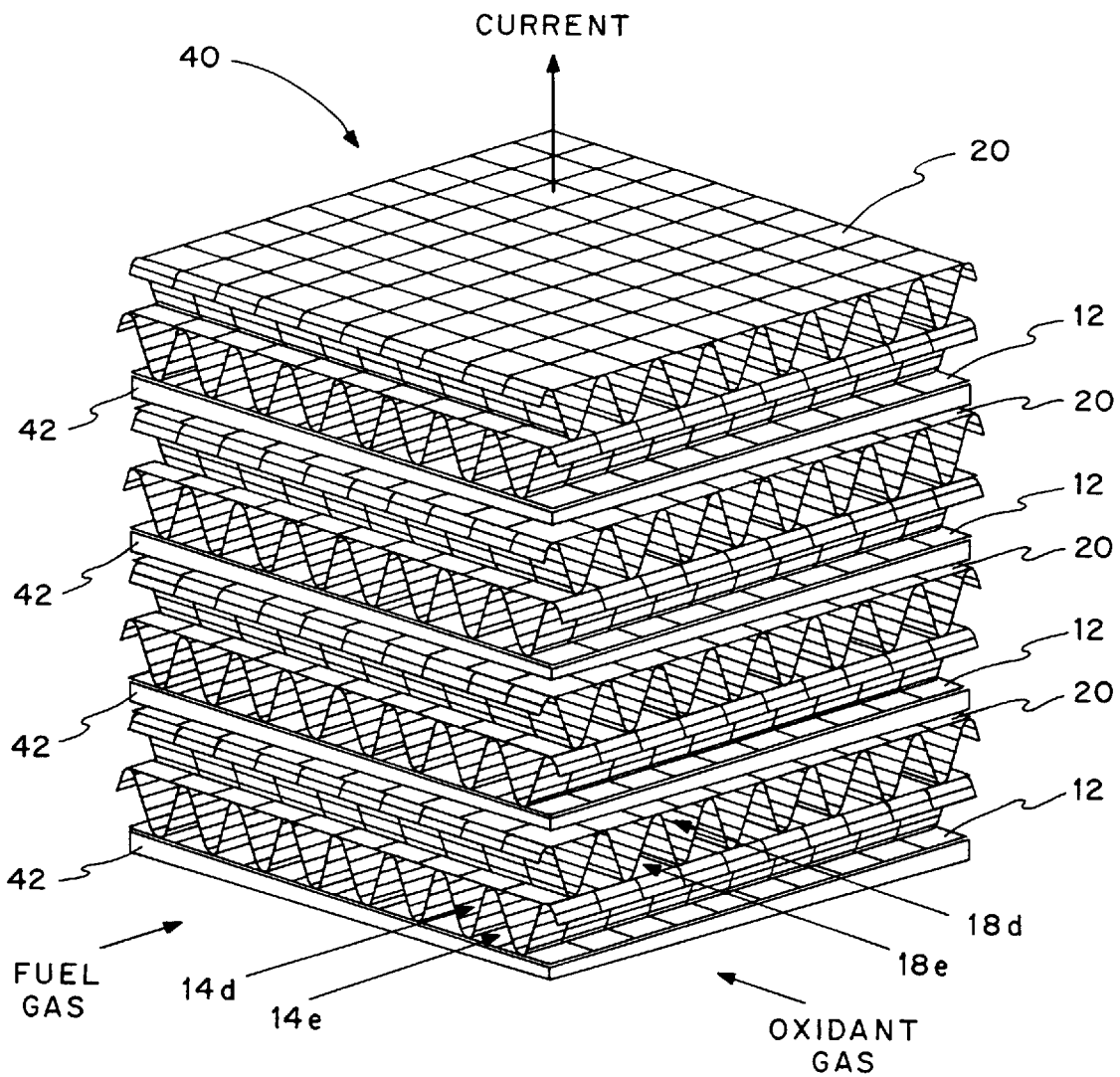
FIG. 4 shows a plurality of single cell units having conductive material disposed between the end surfaces of adjacent cells.

After the single cell units are individually sintered, a plurality of the finished cells are connected in electrical series to form a SOFC stack 40 as shown in FIG. 4. The finished cells are stacked repeatedly and connected in electrical series by providing a suitable conductive material 42 between the adjacent end surfaces of individual cells. The adjacent end surfaces comprise the anode layer 32 of C/I/A composite sheet 20 and the bottom surface of flat anode sheet 12 for each cell. The cells are arranged so that all of the anode channels 14e, 14d are in alignment with the anode channels of adjacent cells, and all of the cathode channels 18d, 18e are in alignment with the cathode channels of adjacent cells. The multi-cellular SOFC 40 is not fused into a continuous, bonded structure, or a monolithic core, but instead is held together by mechanical forces which will be further described below.

This assembly allows single cell units to be radiographed and/or visually examined individually to detect any defects. Since the finished cells are not fused into a monolithic core, any defective single cell unit may be replaced without causing the entire SOFC to be rejected.

The conductive material 42 used to connect adjacent pre-sintered cells in electrical series is selected to conform to the irregularities of the end surfaces of adjacent single cell units. The conductive material may be conductive ceramic powder, or metal felt, wool, or powder. For example, annealed nickel or nickel alloy felt or wool may be provided between the single cell units. Other metals including iron or chromium alloys may also be used. Alternatively, the conductive material may painted or sprayed onto either or both end surfaces of the single cell units. For example, a nickel or nickel alloy powder suspended in a suitable solvent or binder material, or a conductive ceramic or cermet layer, may be painted or sprayed onto either or both of the end surfaces.

Figure 5:
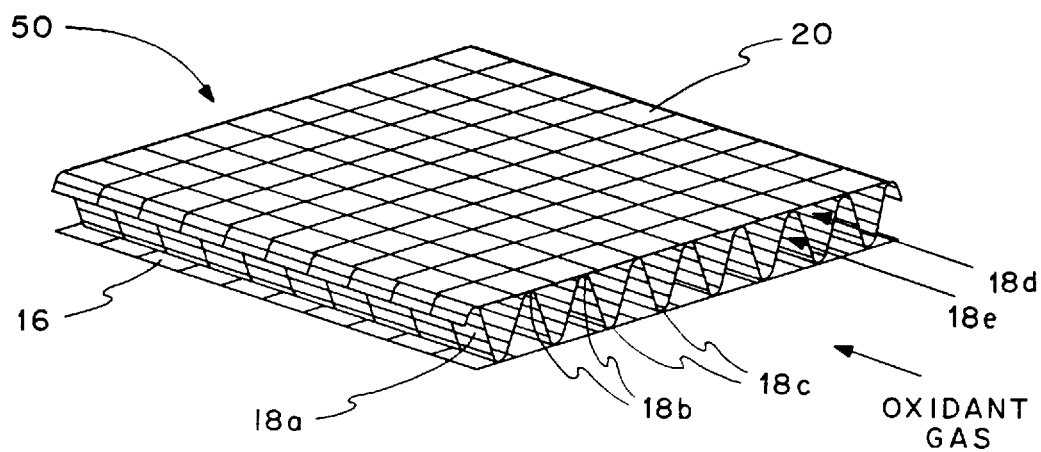
FIG. 5 shows an alternate design for the single cell unit.

FIG. 5 illustrates an alternate embodiment 50 of the single cell unit design. As in the previous embodiment, corrugated cathode sheet 18a is positioned between A/E/C composite sheet 16 and C/I/A composite sheet 20, such that the peaks 18b of the corrugations of cathode sheet 18a are bonded to the cathode layer of C/I/A composite sheet 20 and the troughs 18c of the corrugations of cathode sheet 18a are bonded to the cathode layer of A/E/C composite sheet 16. Corrugated cathode sheet 18a, in combination with the cathode layer of A/E/C composite sheet 16 and the cathode layer of C/I/A composite sheet 20, form a plurality of flow channels 18d, 18e for the oxidant gas. The anode layer of the A/E/C composite sheet 16 and the anode layer of the C/I/A composite sheet 20 comprise the end surfaces of the single cell unit which are electrically connected to adjacent cells.

Figure 6:
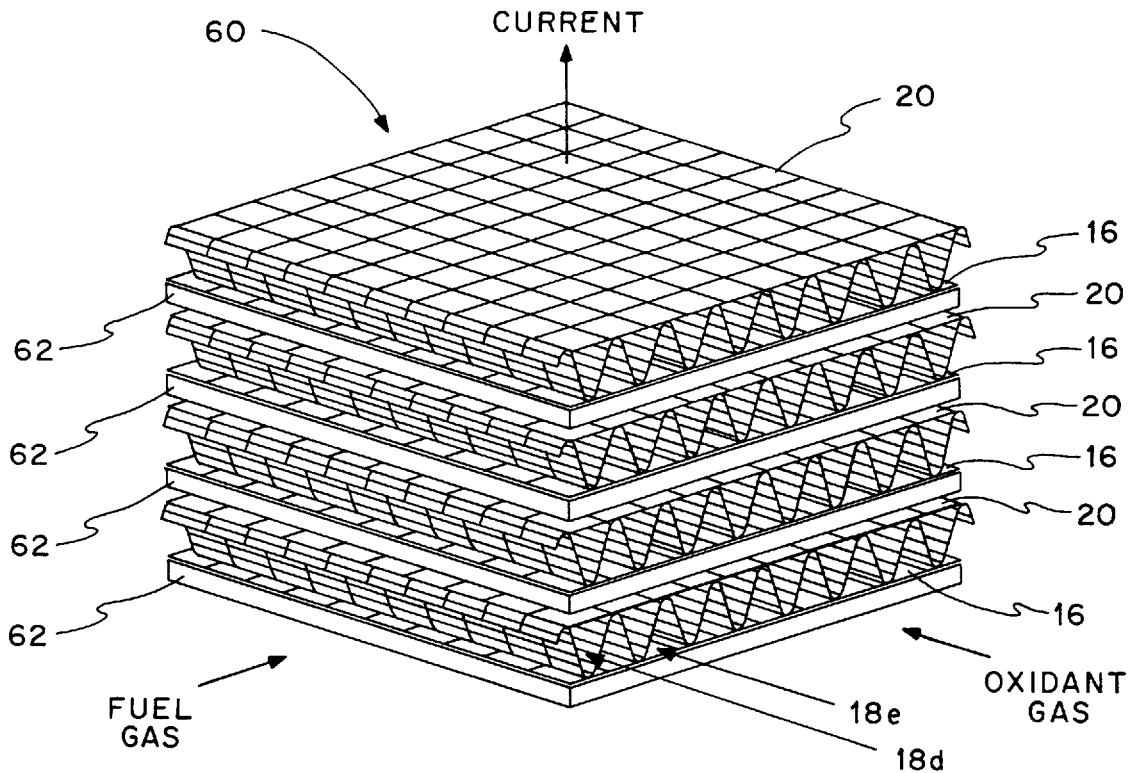
FIG. 6 shows a plurality of single cell units having an alternate design and conductive material provided between adjacent cells which is porous for conducting fuel gas.
Figure 7:
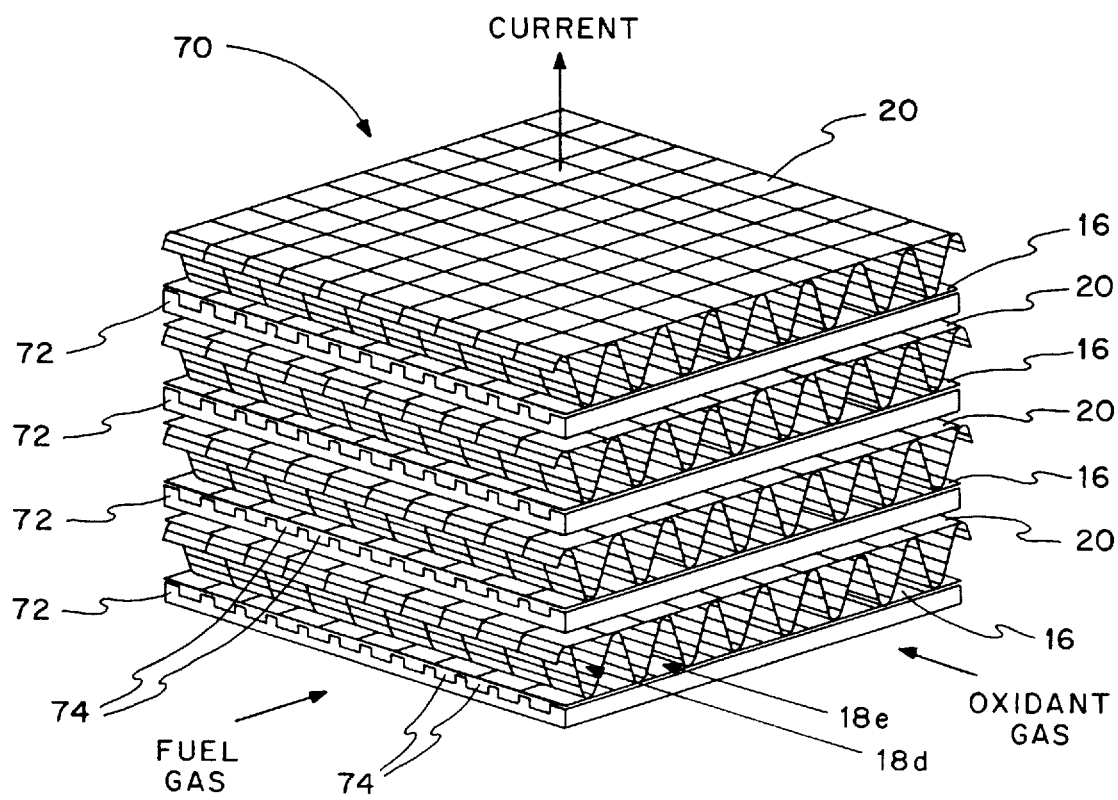
FIG. 7 shows a plurality of single cell units having an alternate design and conductive material provided between adjacent cells which includes fuel gas flow passages.

As in the previous design, the single cell unit 50 is individually fabricated and sintered at a high temperature prior to being assembled into a SOFC stack. Sintering the single cell unit fuses the component materials together into a finished sub-assembly. After sintering, a plurality of the finished cells are connected in electrical series to form a SOFC stack as shown in FIG. 6 and FIG. 7. The finished cells are stacked repeatedly and connected in electrical series by providing a suitable conductive material 62, 72 between the adjacent end surfaces of individual cells. The adjacent end surfaces comprise the anode layer of the A/E/C composite sheet 16 and the anode layer of the C/I/A composite sheet 20 for each single cell unit. The cells are arranged so that all of the cathode channels 18d, 18e are in alignment with the cathode channels of adjacent cells. The multi-cellular SOFC 60, 70 is not fused into a continuous, bonded structure, or a monolithic core, but instead is held together by mechanical forces which will be further described below.

In this alternate prismatic design, the functions of the fuel gas flow channels 14d, 14e and the conductive material 42 in the previous embodiment, shown in FIG. 1 and FIG. 4, are combined into the conductive material component 62 and 72 in FIG. 6 and FIG. 7, respectively. FIG. 6 represents a SOFC 60 formed from a plurality of pre-sintered single cell units which are connected in electrical series with a conductive material 62 having a porosity which allows for the flow of fuel gas. The conductive material may be nickel or metal alloy wool through which the fuel gas flows uniformly over the single cell unit end surface areas. In addition to providing a passageway for the fuel gas, the conductive material maintains cell-to-cell electrical contact.

FIG. 7 represents a SOFC 70 formed from a plurality of pre-sintered single cell units which are connected in electrical series with a conductive material 72 having fuel gas flow channels 74. The conductive material may be nickel or nickel alloy fabricated with grooves and annealed to allow the conductive material to conform to the end surfaces of the single cell units. The conductive material may further be nickel-zirconia cermet with defined gas channels, such that the conductive material is connected to the single cell unit with platinum or other metal paste. Again, in addition to providing a passageway for the fuel gas, the conductive material maintains cell-to-cell electrical contact.

Importantly, in each embodiment described above, anode material comprises both of the end surfaces of the single cell unit which are electrically connected to adjacent cells. Either or both of these end surfaces may contain nickel particles that become points of electrical contact between adjacent cells.

As mentioned previously, the assembled SOFC stack is not bonded or fused together as in a conventional monolithic structure, and, therefore, means for securing the single cell units and conductive material in electrical contact with adjacent cells is required. Clamping may be employed, and where exterior clamps are used, means may further be provided to keep the clamping force constant, such as springs. Alternatively, a simple weight may be positioned on the top of the multi-cell structure.

Many methods of fabrication may be used to form either of the single cell unit designs. For example, all of the components can be tape casted, the anode and cathode sheets corrugated, and the components assembled and bonded to the composites. Alternatively, the A/E/C and C/I/A composites can be tape casted and the electrode materials extruded to form the gas flow passages. Furthermore, hot calendaring, curtain coating, co-extrusion, slip casting, and pressing may be used to form the component parts. For any method of fabrication, the components of a single cell unit are assembled in the green or unfired state, and the assembled single cell units are individually fired or sintered prior to being connected in electrical series.

As in conventional SOFC designs, the anode material must be protected from the oxidant gas to prevent oxidation of the anode material, and the cathode material must be protected from the fuel gas to prevent reduction of the cathode material. Due to the porosity of the anode material comprising the end surfaces of the single cell units, the conductive material provided between the single cell units will be bathed with fuel gas during operation of the fuel cell. To protect the conductive material from exposure to air or oxidant gas, ceramic cement or some other suitable sealing material must be provided either between the single cell units or along the edges thereof to fill any gaps created by the presence of the conductive material.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. An interchangeable and sintered single cell unit for assembly into and possible removal from a solid oxide fuel cell stack comprised of a plurality of mechanically connected individually sintered single cell units, said sintered single cell unit comprising:

a.) a first anode sheet having a top surface and a bottom surface, the bottom surface comprising a first connective end of said single cell unit;

b.) an anode-electrolyte-cathode composite sheet having a layer of anode material, a layer of cathode material, and a layer of electrolyte material sandwiched therebetween;

c.) a shaped second anode sheet disposed between the top surface of said first anode sheet and the anode layer of said anode-electrolyte-cathode composite sheet, whereby said first anode sheet, said second anode sheet, and the anode layer of said anode-electrolyte-cathode composite sheet combine to form a plurality of flow channels for conducting a first reactant gas, said first anode sheet, said second anode sheet, and the anode layer of said anode-electrolyte-cathode composite sheet having interfacial surfaces bonded together by sintering;

d.) a cathode-interconnect-anode composite sheet having a layer of cathode material, a layer of anode material, and a layer of interconnect material sandwiched therebetween, the anode layer of said cathode-interconnect-anode composite sheet comprising a second connective end of said single cell unit; and e.) a shaped cathode sheet disposed between the cathode layer of said anode-electrolyte-cathode composite sheet and the cathode layer of said cathode-interconnect-anode composite sheet, whereby said shaped cathode sheet, the cathode layer of said anode-electrolyte-cathode composite sheet, and the cathode layer of said cathode-interconnect-anode composite sheet combine to form a plurality of flow channels for conducting a second reactant gas, said shaped cathode sheet, the cathode layer of said anode-electrolyte-cathode composite sheet, and the cathode layer of said cathode-interconnect-anode composite sheet having interfacial surfaces bonded together by sintering.

2. The sintered single cell unit according to claim 1, further comprising means for connecting said sintered single cell unit in electrical series to at least one adjacent sintered single cell unit to form a fuel cell stack.

3. The sintered single cell unit according to claim 2, wherein said connecting means is a conductive material for mechanically connecting the first connective end of said sintered single cell unit with the second connective end of said adjacent sintered single cell unit, such that a plurality of sintered single cell units are mechanically connected in electrical series with conductive material interposed therebetween, forming a solid oxide fuel cell stack.

4. The sintered single cell unit according to claim 3, wherein the conductive material consists of metal felt, wool, or powder.

5. The sintered single cell unit according to claim 3, wherein the conductive material consists of ceramic powder.

6. The sintered single cell unit according to claim 1, wherein the flow channels for conducting the first reactant gas are approximately perpendicular to the flow channels for conducting the second reactant gas.

7. The sintered single cell unit according to claim 1, wherein at least one of the first and second connective ends of said sintered single cell unit is anode material containing nickel particles.

8. The sintered single cell unit according to claim 1, wherein the anode material is yttria-stabilized zirconia.

9. The sintered single cell unit according to claim 1, wherein the cathode material is strontium-doped lanthanum manganite.

10. The sintered single cell unit according to claim 1, wherein the electrolyte material is yttria-stabilized zirconia.

11. An interchangeable and sintered single cell unit for assembly into and possible removal from a solid oxide fuel cell stack comprised of a plurality of mechanically connected individually sintered single cell units, said sintered single cell unit comprising:

a.) an anode-electrolyte-cathode composite sheet having a layer of anode material, a layer of cathode material, and a layer of electrolyte material sandwiched therebetween, the anode layer of said anode-electrolyte-cathode composite sheet comprising a first connective end of said single cell unit;

b.) a cathode-interconnect-anode composite sheet having a layer of cathode material, a layer of anode material, and a layer of interconnect material sandwiched therebetween, the anode layer of said cathode-interconnect-anode composite sheet comprising a second connective end of said single cell unit;

c.) a shaped cathode sheet disposed between the cathode layer of said anode-electrolyte-cathode composite sheet and the cathode layer of said cathode-interconnect-anode composite sheet, whereby said shaped cathode sheet, the cathode layer of said anode-electrolyte-cathode composite sheet, and the cathode layer of said cathode-interconnect-anode composite sheet combine to form a plurality of flow channels for conducting a first reactant gas, said shaped cathode sheet, the cathode layer of said anode-electrolyte-cathode composite sheet, and the cathode layer of said cathode-interconnect-anode composite sheet having interfacial surfaces bonded together by sintering.

12. The sintered single cell unit according to claim 11, further comprising means for connecting said sintered single cell unit in electrical series to at least one adjacent sintered single cell unit.

13. The sintered single cell unit according to claim 12, wherein said connecting means is a conductive material for mechanically connecting the first connective end of said sintered single cell unit with the second connective end of said adjacent sintered single cell unit, such that a plurality of sintered single cell units are connected in electrical series with conductive material interposed therebetween, forming a solid oxide fuel cell stack.

14. The sintered single cell unit according to claim 13, wherein said conductive material is porous for conducting a second reactant gas.

15. The sintered single cell unit according to claim 14, wherein the porous conductive material consists of metal felt, wool, or powder.

16. The sintered single cell unit according to claim 13, wherein said conductive material contains flow channels for conducting a second reactant gas.

17. The sintered single cell unit according to claim 11, wherein at least on of the first and second connective ends of said single cell unit is anode materials containing nickel particles.

18. A method for constructing an interchangeable and sintered single cell unit for assembly into and possible removal from a solid oxide fuel cell stack comprised of a plurality of mechanically connected individually sintered single cell units, comprising the steps of:

a.) providing a first anode sheet having a top surface and a bottom surface, the bottom surface comprising a first connective end of said single cell unit;

b.) providing an anode-electrolyte-cathode composite sheet having a layer of anode material, a layer of cathode material, and a layer of electrolyte material sandwiched therebetween;

c.) interposing a shaped second anode sheet between the tope surface of said first anode sheet and the anode layer of said anode-electrolyte-cathode composite sheet, whereby said first anode sheet, said second anode sheet, and the anode layer of said anode-electrolyte-cathode composite sheet combine to form a plurality of flow channels for conducting a first reactant gas;

d.) providing a cathode-interconnect-anode composite sheet having a layer of cathode material, a layer of anode material, and a layer of interconnect material sandwiched therebetween, the anode layer of said cathode-interconnect-anode composite sheet comprising a second connective end of said single cell unit;

e.) interposing a shaped cathode sheet between the cathode layer of said anode-electrolyte-cathode composite sheet and the cathode layer of said cathode-interconnect-anode composite sheet, whereby said shaped cathode sheet, the cathode layer of said anode-electrolyte-cathode composite sheet, and the cathode layer of said cathode-interconnect-anode composite sheet combine to form a plurality of flow channels for conducting a second reactant gas; and f.) sintering said single cell unit, such that the interfacial surfaces of the respective sheets comprising said single cell unit are fused into a continuous bonded structure.

19. The method according to claim 18, further comprising the step of mechanically connecting said sintered single cell unit in electrical series to at least one adjacent sintered single cell unit.

20. The method according to claim 19, wherein the step of mechanically connecting further includes interposing a conductive material between the first connective end of said sintered single cell unit and the second connective end of said adjacent sintered single cell unit, such that a plurality of sintered single cell units are mechanically connected in electrical series with conductive material interposed therebetween, forming a solid oxide fuel cell stack.

21. The method according to claim 20, wherein said conductive material consists of metal felt, wool, or powder.

22. The method according to claim 20, wherein said conductive material consists of ceramic powder.

23. A method for constructing an interchangeable and sintered single cell unit for assembly into and possible removal from a solid oxide fuel cell stack comprised of a plurality of mechanically connected individually sintered single cell units, comprising the steps of:

a.) providing an anode-electrolyte-cathode composite sheet having a layer of anode material, a layer of cathode material, and a layer of electrolyte material sandwiched therebetween, the anode layer of said anode-electrolyte-cathode composite sheet comprising a first connective end of said single cell unit;

b.) providing a cathode-interconnect-anode composite sheet having a layer of cathode material, a layer of anode material, and a layer of interconnect material sandwiched therebetween, the anode layer of said cathode-interconnect-anode composite sheet comprising a second connective end of said single cell unit;

c.) interposing a shaped cathode sheet between the cathode layer of said anode-electrolyte-cathode composite sheet and the cathode layer of said cathode-interconnect-anode composite sheet, whereby said shaped cathode sheet, the cathode layer of said anode-electrolyte-cathode composite sheet, and the cathode layer of said cathode-interconnect-anode composite sheet combine to form a plurality of flow channel for conducting a first reactant gas; and d.) sintering said single cell unit, such that the interfacial surfaces of the respective sheets comprising said single cell unit are fused into a continuous bonded structure.

24. The method according to claim 23, further comprising the step of mechanically connecting said sintered single cell unit in electrical series to at least one adjacent sintered single cell unit.

25. The method according to claim 24, wherein the step of mechanically connecting includes interposing a conductive material between the first connective end of said sintered single cell unit and the second connective end of said adjacent sintered single cell unit, such that a plurality of single cell units are connected in electrical series with conductive material interposed therebetween, forming a solid oxide fuel cell stack.

26. The method according to claim 25, wherein the conductive material is porous for conducting a second reactant gas.

27. The method according to claim 25, wherein the conductive material contains flow channels for conducting a second reactant gas.

28. An interchangeable and sintered single cell unit for assembly into and possible removal from a fuel cell stack comprised of a plurality of mechanically connected individually sintered single cell units, said sintered single cell unit comprising:

two electrodes including an anode and a cathode, said electrodes having an electrolyte therebetween;

a structure for conducting fuel gas to the surface of said anode;

a structure for conducting oxygen to the surface of said cathode; and bonds between the interfacial surfaces of said two electrodes, said electrolyte, and said gas conducting structures caused by sintering, whereby the single cell unit is a continuous structure.

29. A method for constructing a fuel cell stack comprised of a plurality of mechanically connected interchangeable and individually sintered single fuel cells, comprising the steps of:

providing a plurality of assembled single fuel cells, each fuel cell having an electrolyte disposed between an anode and a cathode, and means for conducting fuel and oxygen gases to the surfaces of the anode and the cathode, respectively;

sintering each of the assembled single fuel cells into individual continuous, bonded structures; and mechanically connecting the sintered single fuel cells into a fuel cell stack.

\* \* \* \* \*